United States Patent
Karanam et al.

(10) Patent No.: US 12,045,695 B2
(45) Date of Patent: Jul. 23, 2024

(54) SYSTEM AND METHODS FOR PRIVACY PRESERVING CROSS-SITE FEDERATED LEARNING

(71) Applicant: Shanghai United Imaging Intelligence Co., LTD., Shanghai (CN)

(72) Inventors: Srikrishna Karanam, Cambridge, MA (US); Ziyan Wu, Cambridge, MA (US); Abhishek Sharma, Cambridge, MA (US); Arun Innanje, Cambridge, MA (US); Terrence Chen, Cambridge, MA (US)

(73) Assignee: Shanghai United Imaging Intelligence Co., LTD., Shanghai (CN)

( * ) Notice: Subject to any disclaimer, the term of this patent is extended or adjusted under 35 U.S.C. 154(b) by 427 days.

(21) Appl. No.: 16/804,907

(22) Filed: Feb. 28, 2020

(65) Prior Publication Data

US 2021/0272014 A1    Sep. 2, 2021

(51) Int. Cl.
*G06N 20/00*    (2019.01)
*H04L 9/40*    (2022.01)

(52) U.S. Cl.
CPC ............. *G06N 20/00* (2019.01); *H04L 63/20* (2013.01)

(58) Field of Classification Search
None
See application file for complete search history.

(56) References Cited

U.S. PATENT DOCUMENTS

| | | | |
|---|---|---|---|
| 2015/0193693 A1* | 7/2015 | Vasseur | G06N 20/00 706/12 |
| 2018/0240011 A1* | 8/2018 | Tan | G06N 3/063 |
| 2018/0336486 A1* | 11/2018 | Chu | G06N 20/00 |
| 2019/0227980 A1* | 7/2019 | McMahan | G06N 3/044 |
| 2019/0340534 A1* | 11/2019 | McMahan | G06F 17/18 |
| 2020/0210965 A1* | 7/2020 | Garber | G06N 5/04 |
| 2020/0358599 A1* | 11/2020 | Baracaldo Angel | G06F 21/6227 |
| 2021/0073678 A1* | 3/2021 | Chu | G06N 3/084 |

OTHER PUBLICATIONS

Jonas Geiping et al., Inverting Gradients—How easy is it to break privacy in federated learning?; Dep. of Electrical Engineering and Computer Science, University of Siegen, 34th Conference on Neural Information Processing Systems (NeurIPS 2020), Vancouver, Canada, 11 Pages.

Sigrid Keydana, Posit AI Blog, Hacking deep learning: model inversion attack by example, RStudio, Published May 14, 2020, Keydana 2020, 20 Pages.

Li, et al., FedMD: Heterogenous Federated Learning via Model Distillation, Oct. 2019.

* cited by examiner

*Primary Examiner* — Kenny S Lin
*Assistant Examiner* — Rodrick Mak
(74) *Attorney, Agent, or Firm* — Ziegler IP Law Group

(57) ABSTRACT

Data samples are transmitted from a central server to at least one local server apparatus. The central server receives a set of predictions from the at least one local server apparatus that are based on the transmitted set of data samples. The central server trains a central model based on the received set of predictions. The central model, or a portion of the central model corresponding to a task of interest, can then be sent to the at least one local server apparatus. Neither local data from local sites nor trained models from the local sites are transmitted to the central server. This ensures protection and security of data at the local sites.

20 Claims, 3 Drawing Sheets

SYSTEM AND METHODS FOR PRIVACY PRESERVING CROSS-SITE FEDERATED LEARNING

TECHNICAL FIELD

The aspects of the present disclosure relate generally to machine learning and more particularly to ensuring data privacy in a federated learning model.

BACKGROUND

In machine learning models, data can be hosted locally across multiple sites. With this local data, models can be trained locally to build a central model that exploits the advantages of the local models. However, data privacy and security concerns prohibit the movement of local data out of a local site.

Federated Learning systems have been shown to have a high level of inherent user privacy preserving qualities. The reason for this is mainly due to the user data remaining on the user equipment or device. The part of a Federated Learning is most vulnerable to reducing user privacy is access to the model updates that are moved between the user equipment and the backend server.

While there has been progress in federated learning, these techniques do not guarantee that the privacy of local data will be preserved. There is a concern that local data or trained learning models will be taken from the local site. This presents potential data privacy issues.

Accordingly, it would be desirable to be able to provide a system that addresses at least some of the problems identified above.

SUMMARY

The aspects of the disclosed embodiments are directed to training a central model from a host of locally trained models at multiple local sites. This object is solved by the subject matter of the independent claims. Further advantageous modifications can be found in the dependent claims.

According to a first aspect the above and further objects and advantages are obtained by an apparatus. In one embodiment, the apparatus includes a processor. The processor is configured to transmit a set of data samples to at least one local server apparatus, receive a set of predictions from the local server apparatus, the set of predictions being based on the transmitted set of data samples and train a central model based on the received set of predictions. In this manner, the central model is trained from a host of locally trained models at multiple local sites without taking any local data or trained machine learning models from the local sites.

In a possible implementation of the apparatus the processor is further configured to transmit at least a portion of the central model to the at least one local server apparatus. The ensemble dataset of the central model can be very large. It can be for effective and efficient in terms of time and cost to only send a portion of the large ensemble dataset that is relevant to the specific local node or server.

In a possible implementation form of the apparatus, the processor is further configured to determine at least one task of interest at the at least one local server apparatus, identify the portion of the central model corresponding to at least one task of interest, and transmit the identified portion of the central model corresponding to the at least one task of interest to the at least one local server apparatus. By identifying the specific task of interest at a local node, only data of the central model relevant to the task needs to be sent to the respective local node, rather than the entirety of the ensemble dataset, which can be quite large. This provides efficiencies in terms of time and cost.

In a possible implementation of the apparatus the set of data samples are publicly available data samples. The use of publicly available data samples enables training to proceed at the local site without violating data privacy.

In a possible implementation form of the apparatus the set of data samples is specific to a task of interest at the at least one local server apparatus. The use of publicly available data samples enables training to proceed at the local site without violating data privacy.

In a possible implementation form of the apparatus, the apparatus comprises a training/inference server.

In a possible implementation form of the apparatus the processor is configured to transmit data samples that correspond to tasks of interest at the at least one local server apparatus.

In a possible implementation form of the apparatus the processor is configured to form an ensemble dataset corresponding to the task of interest from the received set of predictions.

In a possible implementation form of the apparatus the at least one local server apparatus is training a local model with local data.

In a possible implementation form of the apparatus the processor is configured to train a central model.

In a possible implementation form of the apparatus the processor is configured to initiate a knowledge distillation process with the at least one local server apparatus.

In a possible implementation form of the apparatus, during the distillation process, the processor is configured to send data to the at least one local server apparatus.

In a possible implementation form of the apparatus the processor is configured to pre-download the data onto the at least one local server apparatus.

In a possible implementation form of the apparatus the at least one local server apparatus infers using such data with its latest local model and obtain products of the inference.

In a possible implementation form of the apparatus, the processor is configured to receive the products of the inference.

In a possible implementation form of the apparatus the processor is configured to aggregate the products of the inferences.

In a possible implementation form of the apparatus, the central model is trained using the aggregated products.

In a possible implementation form of the apparatus, the processor comprises a central server apparatus that is in communication with the central model.

According to a second aspect the above and further objects and advantages are obtained by a method. In one embodiment, the method includes transmitting from a central server a set of data samples to at least one local server apparatus, receiving in the central server a set of predictions from the at least one local server, the set of predictions being based on the transmitted set of data samples, and training a central model at the central server based on the received set of predictions.

In a possible implementation form of the method the method further comprises transmitting at least a portion of the central model from the central server to the at least one local server apparatus. The ensemble data set of the central model can be very large. It can be more effective and efficient in terms of time and cost to only send a portion of the large ensemble dataset that is relevant to the specific local node or server.

In a possible implementation form of the method, the method further comprises determining at least one task of interest at the at least one local server apparatus, identifying a portion of the central model corresponding to at least one task of interest, and transmitting the identified portion of the central model corresponding to the at least one task of interest to the at least one local server apparatus. By identifying the specific task of interest at a local node, only data of the central model relevant to the task needs to be sent to the respective local node, rather than the entirety of the ensemble dataset, which can be quite large. This provides efficiencies in terms of time and cost.

In a possible implementation form of the method the set of data samples comprises publicly available data samples.

In a possible implementation form of the method the set of data samples is specific to a task of interest at the at least one local server apparatus.

In a possible implementation form of the method the central server comprises a training/inference server.

In a possible implementation form of the method the transmitted set of data sample corresponds to a task of interest at the at least one local server apparatus.

In a possible implementation form of the method, the method further comprises forming an ensemble dataset corresponding to the task of interest from the received set of predictions.

In a possible implementation form of the method the at least one local server apparatus is training a local model with local data.

In a possible implementation form of the method the central server is training a central model.

In a possible implementation form of the method the central server can initiate a knowledge distillation process with the at least one local server apparatus.

In a possible implementation form of the method, during the distillation process, the central server sends data to the at least one local server apparatus.

In a possible implementation form of the method the data can be pre-downloaded onto the at least one local server apparatus.

In a possible implementation form of the method the at least one local server apparatus infers using such data with its latest local model and obtain products of the inference.

In a possible implementation form of the method, the central server receives the products of the inference.

In a possible implementation form of the method the central server is configured to aggregate the products of the inferences.

In a possible implementation form of the method, the central model is trained using the aggregated products.

According to a third aspect the above and further objects and advantages are obtained by a computer program product. In one embodiment, the computer program product includes a non-transitory computer readable media having stored thereon program instructions that when executed by a processor causes the processor to perform the method according to any one of the possible implementation forms recited herein.

These and other aspects, implementation forms, and advantages of the exemplary embodiments will become apparent from the embodiments described herein considered in conjunction with the accompanying drawings. It is to be understood, however, that the description and drawings are designed solely for purposes of illustration and not as a definition of the limits of the disclosed invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

In the following detailed portion of the present disclosure, the invention will be explained in more detail with reference to the example embodiments shown in the drawings, in which.

DETAILED DESCRIPTION OF THE DISCLOSED EMBODIMENTS

Figure 1:
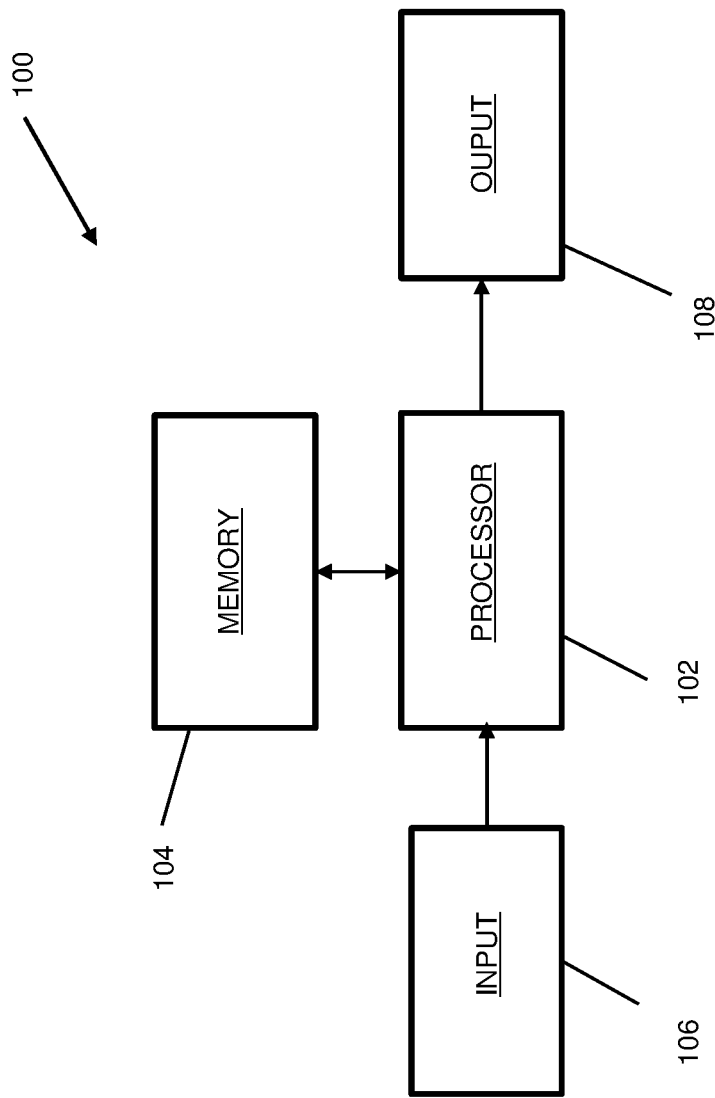
FIG. 1 illustrates a schematic block diagram of an exemplary apparatus incorporating aspects of the disclosed embodiments.

Referring to FIG. 1, a schematic block diagram of an exemplary apparatus 100 incorporating aspects of the disclosed embodiments is illustrated. The aspects of the disclosed embodiments are configured to train a central model from a host of locally trained models at multiple, local sites. Data privacy is explicitly preserved by not using local data or moving trained machine learning models from the local sites.

As is illustrated in FIG. 1, in one embodiment, the apparatus 100 includes at least one processor 102 and a corresponding memory 104 for storing one or more programs which are executable by the processor 102 for performing the methods described herein. The apparatus 100 also includes at least one input device 106 for receiving input data and at least one output device 108 for outputting data. In alternate embodiments, the apparatus 100 can include any other devices or components suitable for a machine learning environment. In one embodiment, the apparatus 100 comprises a training/inference server.

Figure 2:
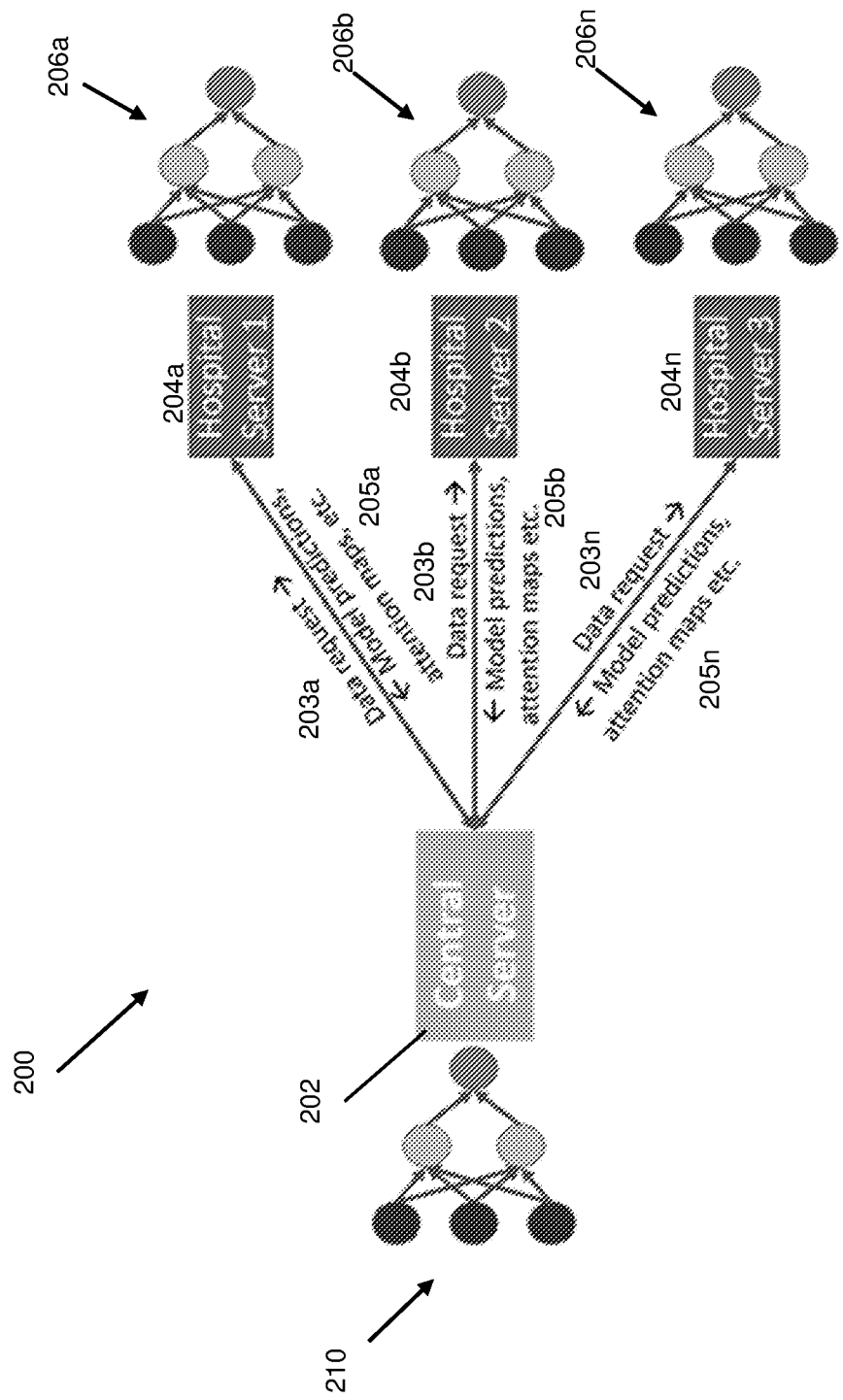
FIG. 2 illustrates an exemplary privacy preserving cross-hospital federated learning setting incorporating aspects of the disclosed embodiments.

As will be generally described herein, in one embodiment, the processor 102 is configured to transmit a set of data samples to at least one local server apparatus, such as for example server 204 shown in FIG. 2. The processor 102 is configured to receive a set of predictions from the local server 204, the set of predictions being based on the transmitted set of data samples. The processor 102 is then configured to train a central model based on the received set of predictions and transmit the central model to the at least one local server apparatus 204. The set of data samples in this example is a publicly available set of data samples. In this manner, local data or trained machine learning models are not taken or removed from the local site, such as the local server apparatus 204 and the privacy of the data at the local site is maintained.

Examples of the processor 102 includes, but are not limited to, a microprocessor, a microcontroller, a complex instruction set computing (CISC) microprocessor, a reduced instruction set (RISC) microprocessor, a very long instruction word (VLIW) microprocessor, or any other type of processing circuit. Optionally, the processor 102 may be one or more individual processors, processing devices and various elements associated with a processing device that may be shared by other processing devices. Additionally, the one or more individual processors, processing devices and elements are arranged in various architectures for responding to and processing the instructions that drive the apparatus 100.

In one embodiment, one or more of the input module 106 and/or the output module 108 can include one or more communication networks or modules to enable communication and the transfer of information to and from the apparatus 100. The communication network may be a wired or wireless communication network. Examples of the communication network may include, but are not limited to, a Wireless Fidelity (Wi-Fi) network, a Local Area Network (LAN), a wireless personal area network (WPAN), a Wireless Local Area Network (WLAN), a wireless wide area network (WWAN), a cloud network, a Long Term Evolution (LTE) network, a plain old telephone service (POTS), a Metropolitan Area Network (MAN), and/or the Internet. Exemplary communication protocols can include wired and wireless communication protocols, such as but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, Long Term Evolution (LTE), Light Fidelity (Li-Fi), and/or other cellular communication protocols or Bluetooth (BT) communication protocols, including variants thereof.

The memory 104 can generally comprise suitable logic, circuitry, interfaces, and/or code that may be configured to store instructions executable by the processor 102. Exemplary implementations of the memory 104 may include, but are not limited to, Random Access Memory (RAM), Read Only Memory (ROM), Hard Disk Drive (HDD), Flash memory, and/or a Secure Digital (SD) card. A computer readable storage medium for providing a non-transient memory may include, but is not limited to, an electronic storage device, a magnetic storage device, an optical storage device, an electromagnetic storage device, a semiconductor storage device, or any suitable combination of the foregoing.

FIG. 2 illustrates an exemplary system 200 incorporating aspects of the disclosed embodiments. In this example, the system 200 generally comprises a distributed framework for training a machine learning model. As shown in FIG. 2, the system 200 includes at least a central server 202 and a plurality of local nodes 204a-204n. Although only three local nodes 204a-204n are shown in this example, the aspects of the disclosed embodiments are not so limited. In alternate embodiments, the system 200 can include any suitable or desired number of local nodes, other than including three. It will be understood that the system 200 forms or is part of a machine learning network.

The local nodes or sites 204a-204n will be configured to host their own data and training/inference services locally. The local nodes 204a-204n are also configured to communicate with the central server 202, also referred to as a centrally located training/inference server.

At each local site 204a-204n, the local data will be used to train a respective local model 206a-206n, using a local training server. In one embodiment, the respective local models 206a-206n can then be deployed for in-house artificial intelligence (AI) services.

As illustrated in FIG. 2, each local site 204a-204n is configured to be able to receive messages from and transmit message to the central server 202. However, in accordance with the aspects of the disclosed embodiments local data at a local site 204a-204n will not be transmitted to the central server 202.

For the purposes of the description herein, the system 200 will generally be referred to as a cross-hospital federated learning setting. The local sites or nodes 204a-204n in this example can generally be referred to as "hospital sites" or "hospital servers." While the aspects of the disclosed embodiments will generally be described with respect to a health care or hospital environment, the aspects of the disclosed embodiments are not so limited. In alternate embodiments, the aspects of the disclosed embodiments can be applied to or implemented in any machine learning system where data privacy is a concern.

The central server or node 202 shown in FIG. 2 is configured to orchestrate the training of a central model, generally shown as 210. The central model 210, as well as the local models 206a-206n, can comprise any suitable machine learning model, such as a neural network architecture.

The aspects of the disclose embodiments involves two main processes. The first is the training of the local models 206a-206n on corresponding local data. The knowledge from the training of the local models 206a-206n is then distilled into the central model 210, which is trained at the central node 202.

Figure 3:
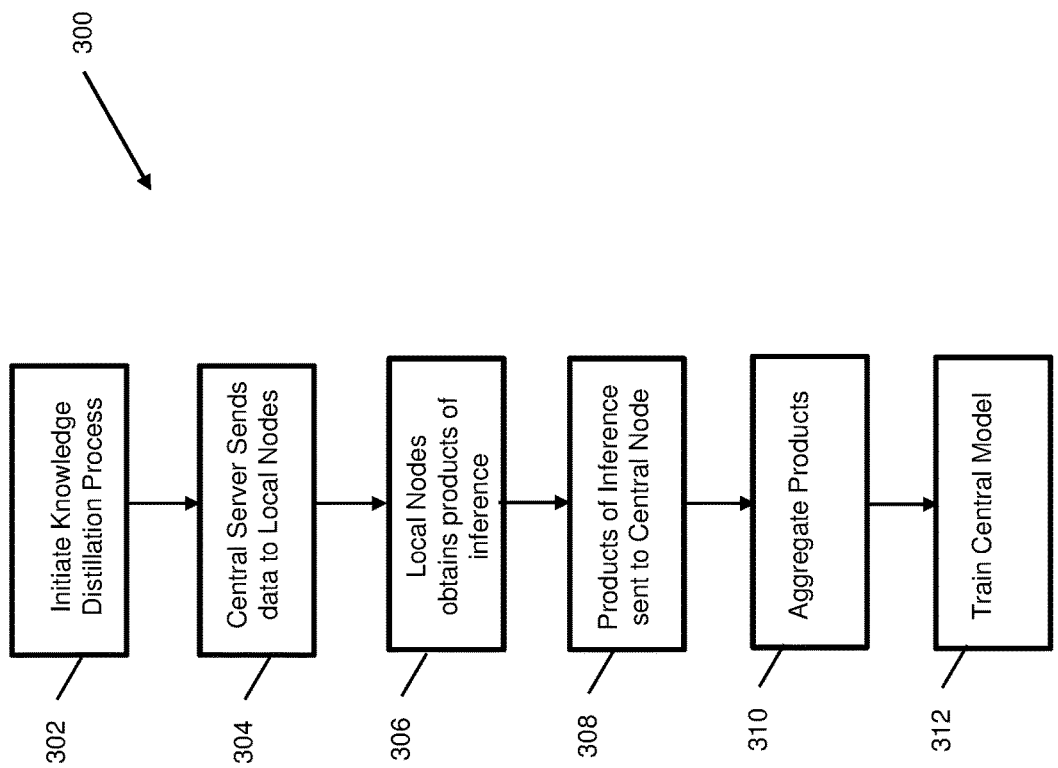
FIG. 3 illustrates an exemplary method incorporating aspects of the disclosed embodiments.

For example, referring also to FIG. 3, in one embodiment, at any point during the training of the central model, the central node 202 can initiate 302 a knowledge distillation process with one of or more of the local nodes 204a-204n. In one embodiment, the knowledge distillation process initiated by the central node 202 can occur at the end of each epoch in training a local model, such as one or more of local models 206a-206n. In an alternate embodiment, the knowledge distillation process initiated by the central node 202 can occur at the end of the training of the one or more local models 206a-206n.

During the distillation process, the central server 202 sends 304 data to the one or more of the local nodes 204a-204n. In one embodiment, the data can be pre-downloaded onto the one or more local nodes 204a-204n. The data sent during the distillation process comprises public data, and not private data. Typically, there are repositories of datasets for different tasks available online. These repositories are configured to index the available public datasets with their links. These resources are used to download the data to the central servers, such as central server 202.

Each of the one or more local nodes 204a-204n can be configured to infer using such data with its latest local model, and obtain 306 products, such as activations, predictions, features or any kind of explanation, of the inference. The products of the inference will be sent 308 back to the central node 202.

The central node 202 is configured to aggregate 310 the products of the inferences from the one or more local nodes 204a-204n. Using the aggregated products of the inferences, the central model 210 will be trained 312, updated and/or finetuned with certain knowledge/explanation distillation objectives functions. The privacy of the local data of the local nodes 204a-204n is preserved through the entire training process, as no local data, partial or complete local models, are transferred to the central node 202.

A multi-faced approach is used to train the central model 210. At the central node 202, a large dataset is prepared and collected. The large dataset will be used to train the central model 210.

The large dataset that is used to train the central model 210 will not have any data from any of the local nodes 204a-204n. Instead, it is assumed that the particular task of interest at each of the local nodes 204a-204n is known. Given this knowledge, data is collected from different sources that is related to the particular task(s) of interest. The data samples present in the dataset can be manually or automatically annotated. Manual annotation refers to an individual or individuals annotating the data. For example, an individual can annotate where the lung nodule is in the downloaded data. Automatic annotation refers to the use of an automated process, such as the use of an existing algorithm, to generate the annotations.

This process is repeated for all tasks of interest at all of the local nodes 204a-204n. The result can be a large ensemble dataset, also referred to as a central large-scale dataset. This large dataset will generally correspond to the tasks of interest at all of the local nodes 204a-204n. The aspects of the disclosed embodiments are configured to enable a local node of the local nodes 204a-204n to receive a dataset corresponding to the task of interest at that local node, or alternatively, receive the entire large ensemble dataset when the task of interest is not known.

There can be different tasks of interest at each node 204a-204n. The central dataset can correspond to one or more of the task(s) of interest at the local nodes 204a-204n. If the local task is known, the respective local node of local nodes 204a-204n would receive the data corresponding to the task of interest. If the local task is unknown, the local node would receive the entire dataset.

In one embodiment, referring also to step 304 of FIG. 3 described above, the large ensemble dataset can be pre-loaded onto each of the local nodes 204a-204n. During the knowledge distillation process initiated by the central node 202 described above, the central node 202 sends only a process initiation signal, or a collection of data indices of the large ensemble dataset, such as a subset, to the local nodes 204a-204n.

In one embodiment, during the knowledge distillation process initiated by central node 202, the data indices of the ensemble dataset sent by central node 202 can be determined in a bootstrapping fashion. The data indices for the next distillation process can be selected based on the outcome of the current distillation process. For example, only data with unsatisfactory consensus from all of the local nodes 204a-204n are selected for the next round of distillation.

Given this central dataset, predictions are now obtained on each sample from each of the local node learning models. This involves the central node 202 sending each data sample to each of the individual local inference servers in the respective local nodes 204a-204n, and retrieving the prediction information. In this process, the local nodes 204a-204n are not transmitting any local proprietary data outside of the respective local network. Instead, the central node 202 sends data 203a-203n from the pre-collected ensemble dataset and only retrieves inference products 205a-205n from the trained local model 206a. In this manner, there is conformity to the privacy requirements of the local nodes 204a-204n.

The inference products retrieved from the inference servers of the respective local nodes 204a-204n may include, but are not be limited to, the prediction result from the machine learning model, feature map activations from the a specific intermediate layer of the machine learning model, or feature map activations from multiple intermediate layers of the machine learning model. For example, a prediction result could be whether the image is a cat or a dog.

In one embodiment, given all the prediction information retrieved from all the local nodes 204a-204 on all the data samples in the ensemble dataset, the method can include training a central machine learning model in a student and ensemble-teacher fashion. In this example, there are multiple teacher models from all the local nodes 204a-204n, such as hospital sites.

In one embodiment, the specific training objective of the central model 210 is to make sure that the predictions of the central model 210 are as close as possible to the ensemble prediction of all the teacher models from all the local node 204a-204n.

In one embodiment, once the training process of the central model 210 has converged, the central model 210 is now ready to be deployed. At this stage, the central node 202 communicates to each of the individual local nodes 204a-204n that a new machine learning model is ready for deployment. This communication can also include the corresponding accuracy statistics of the model, such as for example, new performance on an existing test dataset. The central node 202 waits for a signal from a manger of each local node 204a-204n.

When a respective site manager communicates the need to update the corresponding local model to the central server 202, the central server 202 transmits, via a communications channel in a predefined format, the new centrally trained model 210 to the respective local node 204a-204n. This process of deploying updated machine learning models is then repeated for all the local sites that request updating their local machine learning models.

The aspects of the disclosed embodiments are configured to repeat the process of training central models and updating local models as and when necessary. Specifically, if any individual local node, or even multiple local nodes, decide to deploy a new locally trained model in their inference server, the aspects of the disclosed embodiments can check for this occurrence. In one embodiment, the central server 202 can be configured to periodically communicate with each local node 204a-204n to ask for any changes in the corresponding local model 206a-206n. If there is a change, the local node 204a-024n, or respective local site manager, can respond. The process of training a new central model will be triggered, repeating all the steps described above.

The aspects of the disclosed embodiments are directed to learning a central model from a host of locally trained models at multiple local sites. Data privacy is preserved by not taking or transferring any local data or trained machine learning models from the local sites. Student-teacher ensemble knowledge techniques are used to learn privacy preserving central machine learning models from multiple, locally trained machine learning models.

Thus, while there have been shown, described and pointed out, fundamental novel features of the invention as applied to the exemplary embodiments thereof, it will be understood that various omissions, substitutions and changes in the form and details of devices and methods illustrated, and in their operation, may be made by those skilled in the art without departing from the spirit and scope of the presently disclosed invention. Further, it is expressly intended that all combinations of those elements, which perform substantially the same function in substantially the same way to achieve the same results, are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A central server comprising:
a processor configured to:
transmit a set of public data samples from the central server with a central machine learning model to at least one local server apparatus, the at least one local server apparatus including a local machine learning model that is previously trained using private data samples, wherein the at least one local server apparatus is configured to generate a set of predictions based only on the set of public data samples;
cause the central machine learning model to receive only the set of predictions from the at least one local server apparatus; and
train the central machine learning model based on the received set of predictions that are based only on the public data samples, wherein the private data samples used to train the at least one local server apparatus are not accessible to the central machine learning model.

2. The central server according to claim 1, wherein the processor is further configured to transmit at least a portion of the central model to the at least one local server apparatus.

3. The central server according to claim 2, wherein the processor is further configured to determine at least one task of interest at the at least one local server apparatus, identify a portion of the central model corresponding to at least one task of interest, and transmit the identified portion of the central model corresponding to the at least one task of interest to the at least one local server apparatus.

4. The central server according to claim 1, wherein the set of data samples is specific to a task of interest at the at least one local server apparatus.

5. The central server according to claim 1, wherein the apparatus comprises a training/inference server.

6. The central server according to claim 1, wherein the transmitted set of data samples corresponds to a task of interest at the at least one local server apparatus.

7. The central server according to claim 1, wherein the processor is further configured to form an ensemble dataset corresponding to at least one task of interest from the received set of predictions.

8. A method, comprising:
transmitting from a central server, a set of public data samples to at least one local server apparatus, the at least one local server apparatus including a local machine learning model previously trained using private data samples;
receiving in the central server, a set of predictions from the at least one local server apparatus, the set of predictions generated by the local machine learning model using only the transmitted set of public data samples; and
training a central machine learning model in the central server based on the received set of predictions, wherein the private data samples used to train the at least one local server apparatus, or any products of the private data samples, are not transmitted to the central machine learning model.

9. The method according to claim 8 wherein the method further comprises transmitting at least a portion of the central model from the central server to the at least one local server apparatus.

10. The method according to claim 9, the method further comprising determining at least one task of interest at the at least one local server apparatus, identifying a portion of the central model corresponding to at least one task of interest, and transmit the identified portion of the central model corresponding to the at least one task of interest to the at least one local server apparatus.

11. The method according to claim 8, wherein the set of public data samples is specific to a task of interest at the at least one local server apparatus.

12. The method according to claim 8, wherein the central server comprises a training/inference server.

13. The method according to claim 8, wherein the central server is configured to aggregate products of inferences of individual ones of the at least one local server apparatus and train the central machine learning model using the aggregated products without using any local data from the at least one local server apparatus.

14. The method according to claim 8, wherein the method further comprises forming an ensemble dataset corresponding to the task of interest from the received set of predictions.

15. The method according to claim 8, the at least one local server apparatus is configured to generate the set of predictions using the local machine learning model which takes the public data samples as an input.

16. A computer program product comprising a non-transitory computer readable media having stored thereon program instructions that when executed by a processor causes the processor to perform the method according to claim 8.

17. The central server according to claim 1, wherein the set of predictions are generated by models on the at least one local server apparatus with data transmitted from the central machine learning model.

18. The central server according to claim 17, wherein once the central server updates the central machine learning model, the update of the central machine learning model is transmitted back to the at least one local server apparatus, wherein the local machine learning model updates the set of predictions based on the update from the central machine learning model.

19. The central server according to claim 1, wherein the at least one local server apparatus are trained independently of one another and the received set of predictions is based on the public data samples.

20. The method according to claim 8, wherein the at least one local server apparatus are trained independently of one another and the received set of predictions is based on the public data samples.

* * * * *